Figures 1, 2:
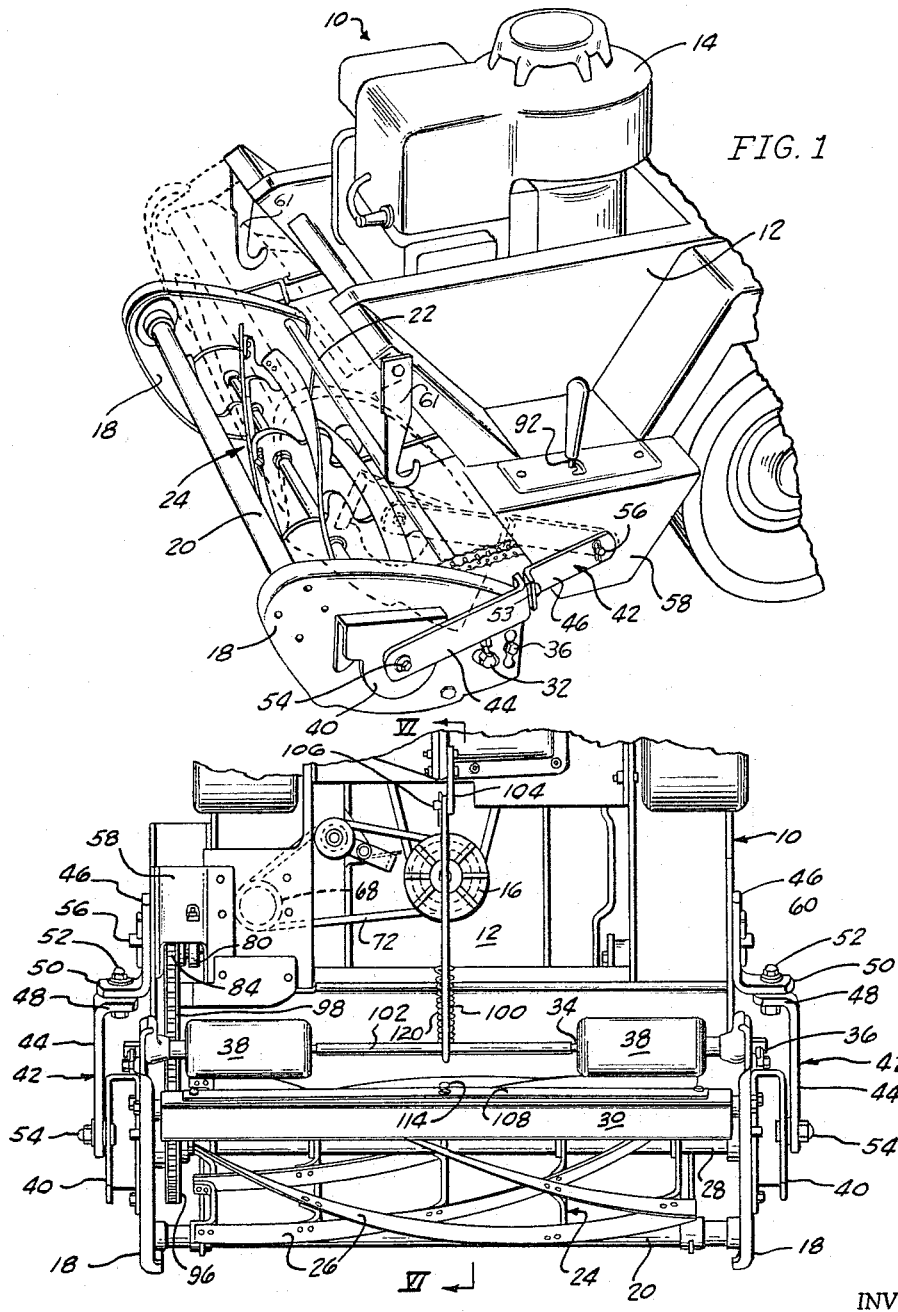

Aug. 23, 1966  R. A. HANSON ET AL  3,267,654
FRONT MOUNTING FOR REEL TYPE MOWER
Filed Sept. 4, 1964  3 Sheets-Sheet 1

INVENTORS
RUDOLPH A. HANSON
EDWARD J. ZIEGLER
JOHN E. FISCHER
BY Beaman & Beaman
ATTORNEYS INVENTORS
RUDOLPH A. HANSON
EDWARD J. ZIEGLER
JOHN E. FISCHER
BY Beaman & Beaman
ATTORNEYS INVENTORS
RUDOLPH A. HANSON
EDWARD J. ZIEGLER
JOHN E. FISCHER
BY Beaman & Beaman
ATTORNEYS

United States Patent Office 3,267,654
Patented August 23, 1966

3,267,654
FRONT MOUNTING FOR REEL TYPE MOWER
Rudolph A. Hanson, Edward J. Ziegler, and John E. Fischer, Jackson, Mich., assignors to Yard-Man, Inc., Jackson, Mich., a corporation of Michigan
Filed Sept. 4, 1964, Ser. No. 394,464
4 Claims. (Cl. 56—26)

The invention pertains to a reel lawn mower attachment adapted to be attached to the front of supporting and motive means, such as a lawn tractor, or the like.

Self-propelled riding lawn mowers are currently enjoying widespread popularity. The invention pertains to a reel lawn mower attachment which may be used with lawn tractors or other supporting and motive means wherein the reel mower attachment may be mounted upon the front of the motive means and is positionable between operative and inoperative positions. The location of the grass cutting device with lawn tractors, and the like, at the front of the tractor is of advantage, in that the front mounting permits the grass to be cut before it has been compressed by the wheels of the mower or tractor.

One of the problems attendant with providing a satisfactory reel type lawn mower attachment for lawn tractors lies in the manner of support of the attachment. To produce optimum cutting characteristics, the relationship of the mower cutting bar to the reel blades and the terrain is critical. When the reel mower is supported on the lawn tractor, the short wheel base of this type of tractor often causes the desired relationship of the cutting bar to the terrain to change when the tractor is tilted downwardly or upwardly, as when going down or up an incline, or traversing irregular terrain. Such problems can be alleviated by placing supporting wheels and ground rollers on the mower attachment. However, the use of wheels on the mower attachment, if placed on the side thereof, prevents close trimming to fixed obstacles, and if the wheels are placed ahead of the reel, the wheels will compress the grass prior to cutting.

It is an object of the invention to provide a reel lawn mower attachment which may be mounted on the front of tractor, or other supporting and motive means, which is uniquely mounted to the supporting means so that any longitudinal inclination of the tractor does not adversely effect the relationship of the cutting bar to the terrain and, thus, provides proper cutting characteristics at all times.

Another object of the invention is to provide a reel type lawn mower attachment which is adapted to be mounted on the front of supporting and motive means wherein the attachment may be easily rendered inoperative and raised to a transporting position wherein the mower is raised from contact with the lawn.

Another object of the invention is to provide a reel type lawn mower attachment adapted to be mounted on the front of supporting and motive means wherein clutch means are employed to selectively engage and disengage the reel from power take-off means defined on the motive means.

An additional object of the invention is to provide a reel type lawn mower attachment capable of being mounted on the front of a lawn tractor, or the like, wherein a four bar linkage arrangement affixes the mower attachment to the tractor, and a ground roller is employed as the sole means for maintaining the desired height of the cutting bar above the terrain to determine the height of cut.

A further object of the invention is to provide reinforcing means for a reel type lawn mower cutting bar wherein the reinforcing means is in the form of a truss and the compression elements thereof are adjustable.

Figure 4:
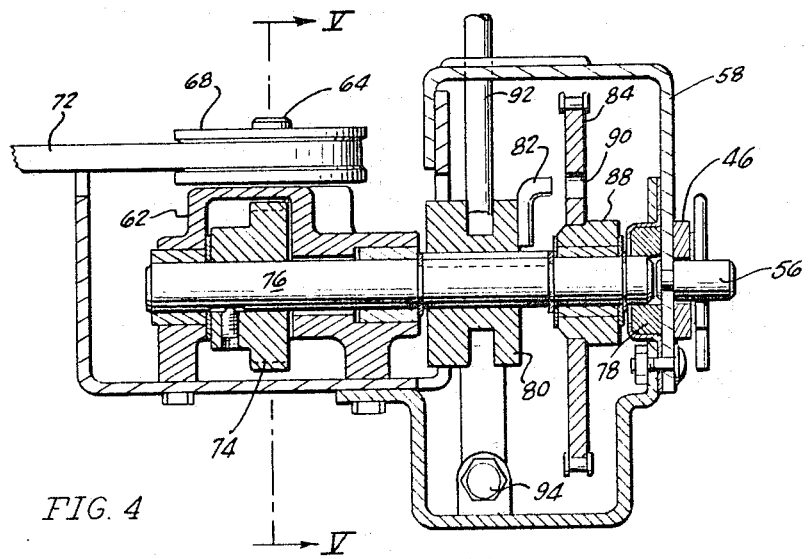
Figure 5:
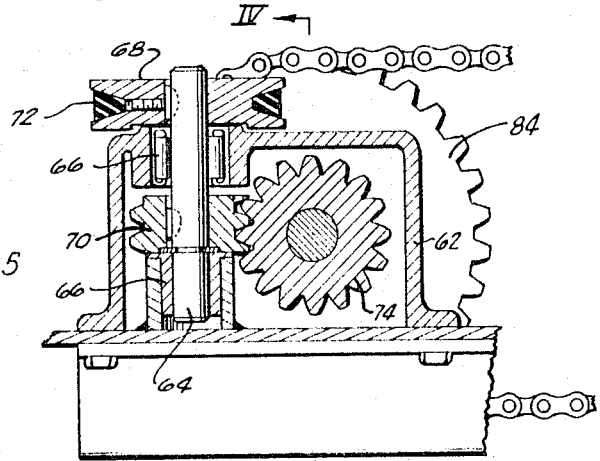
Figure 3:
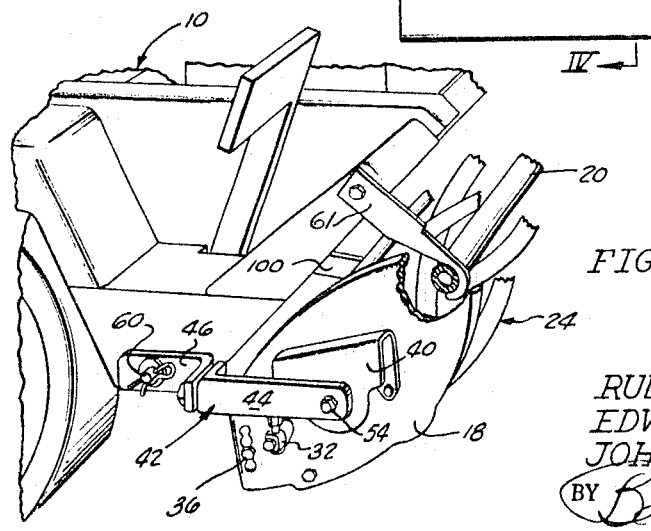
Figure 6:
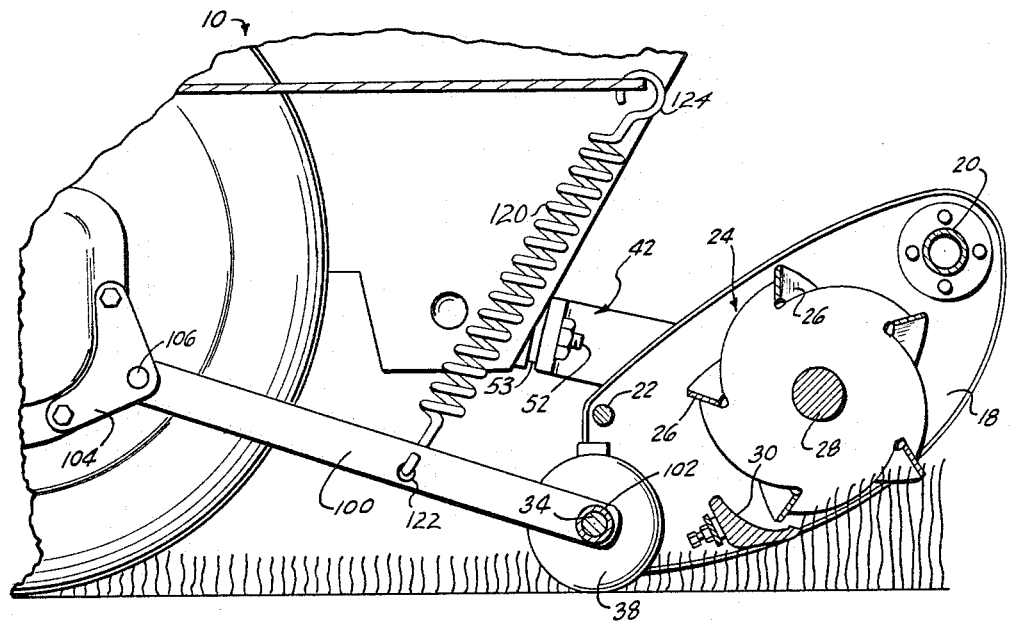
Figure 7:
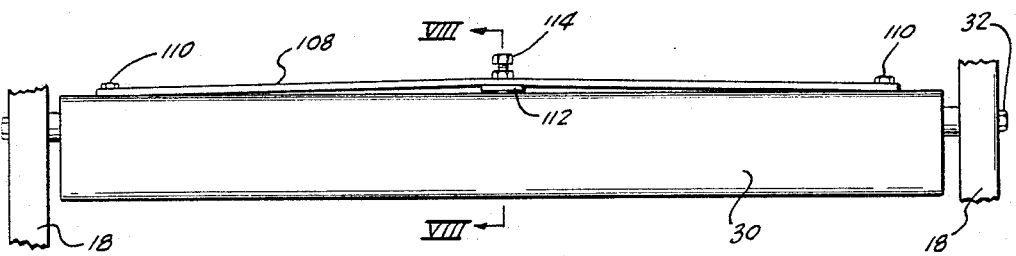
Figure 8:
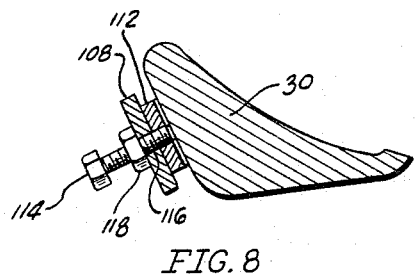

These and other objects of the invention arising from the relationship and details of components of an embodiment thereof will be apparent from the following description and accompanying drawings wherein:

FIG. 1 is a left front and side perspective view of a reel lawn mower attachment in accordance with the invention illustrating the attachment as mounted upon a lawn tractor, the operative position being shown in full lines and the elevated, inoperative, transporting position being illustrated in dotted lines, FIG. 2 is a detail underside view of the lawn mower attachment in accord with the invention as mounted on the tractor illustrated in FIG. 1, FIG. 3 is a detail, enlarged, perspective view of the right front and side of the attachment as mounted on the tractor, a portion of the end plate being broken away and illustrating the attachment as retained in the elevated inoperative and transport position, FIG. 4 is an elevational, sectional view of the reel lawn mower attachment transmission and clutch unit as taken along section IV—IV of FIG. 5, FIG. 5 is an elevational, sectional view taken along section V—V of FIG. 4, FIG. 6 is an elevational, sectional, operating view illustrating the lower linkage, and lawn mower structure, as if taken along section VI—VI of FIG. 2, FIG. 7 is a detail, perspective view of the truss member and cutting bar structure, and FIG. 8 is an elevational, sectional view of the truss member compression stud, as taken along section VIII—VIII of FIG. 7.

While the particular construction of the lawn tractor with which the reel lawn mower attachment of the invention may be employed forms no part of the present invention, the relationship of the components of the lawn mower attachment to the tractor does form a portion of the invention and the general relationship of the mower attachment to the tractor will be apparent from FIGS. 1 through 3. The tractor constituting the reel lawn mower attachment supporting and motive means is generally indicated at 10 and includes a body 12 upon which an engine 14 is mounted. The engine 14 is shown as being of the vertical crankshaft type having a drive shaft extending through to the underside of the tractor on which power take-off means in the form of a pulley 16, FIG. 2, is affixed. The transmission and clutch means for the reel lawn mower attachment are affixed to the tractor structure and are provided with power input and output means, as will be later described.

The reel lawn mower attachment in accord with the invention includes a pair of stamped sheet steel end plates 18. The end plates 18 are maintained in parallel spaced relationship by a primary elongated spacing member 20 and a secondary spacer 22. A reel 24 is rotatably interposed between the end plates 18 having spirally disposed blades 26 defined thereon. In the conventional manner the reel 24 is mounted on a shaft 28 which is journaled in bearings mounted on the end plates 18, not shown. A cutting bar 30 is also interposed between the end plates 18 and mounted thereon by conventional mounting means 32 which provide for adjustment of the cutting bar. Of course, the cutting bar 30 is disposed parallel to the axis of reel rotation. A ground roller shaft 34 is also interposed between and mounted on the end plates 18 by adjustable means generally indicated at 36. A pair of spaced ground rollers 38 are rotatably mounted upon the ground roller shaft 34.

An inverted U-shaped bracket 40 is mounted on the exterior surface of each of the end plates 18 and the brackets serve as the means whereby the arms 42 may be pivotally attached to the end plates. The arms 42 are each of a two-piece construction including portions 44 and 46 having offset positions 48 and 50, respectively, interconnected by a bolt 52. Shims 53 placed between offset portions 48 and 50 provide adjustment of the arm length for drive chain tension adjustment purposes. Pins 54 interconnect one end of the arms 42 to the associated bracket 40. Preferably, the pins 54 are coaxial with the reel shaft 28. The other end of the arms 42 is pivotally mounted on the tractor structure. The arm 42 disposed adjacent the mower drive transmission is mounted on a pin 56 which extends from the transmission housing 58, FIG. 4. The arm 42 on the opposite side of the tractor, FIG. 3, is affixed thereto on a pin 60 and maintained thereon by a cotter pin and washer arrangement.

The pivotal interconnection of the arms 42 to the tractor 10 and the end plate brackets 40 permits the entire lawn mower attachment structure to be raised or lowered with respect to the tractor and the terrain. Thus, the mower structure may be raised from the terrain to the dotted line position shown in FIG. 1, which is designated the inoperative or transporting position. This position is also illustrated in solid lines in FIG. 3. To maintain the mower structure in the elevated transporting position, a pair of hooks 61 are pivotally mounted on the tractor structure. The hooks 61 may be swung over the spacing member 20, as shown in FIG. 3, to hold the mower structure in the elevated position.

The lawn mower attachment transmission includes a worm gear casing 62 affixed to the tractor in which a shaft 64 is rotatably journaled within bearings 66. The vertically disposed shaft 64 is provided with a V-belt pulley 68 keyed to the upper end thereof and a worm gear 70 is keyed thereto within the casing. A belt 72 drivingly interconnects the pulley 68 with the tractor power take-off pulley 16, FIG. 2.

The worm wheel 74, meshing with the worm gear 70, is affixed to a shaft 76 rotatably journaled within the casing 62 and extending into the housing 58. The outboard end of the shaft 76 is mounted within bearing 78 affixed to the inner surface of the housing 58. A collar 80 is axially slidably supported upon the shaft 76 and is keyed thereto by means of a spline, or similar known arrangement, whereby the collar will rotate with the shaft but may be axially positioned thereon. A clutch dog 82 is affixed to the collar. A chain sprocket 84 is rotatably mounted on the shaft 76 by a bearing 88. The sprocket 84 includes a plurality of holes 90, one of which is shown, which are radially aligned with the dog 82. The collar 80 may be moved toward the sprocket 84 to engage the dog 82 with a hole 90 by means of a control lever 92 pivotally connected to the housing 58 at its lower end by a pivot pin 94. The upper end of the control lever 92 extends through the housing and is accessible by the operator, as will be apparent from FIG. 1. Thus, upon shifting the collar 80 to the declutched position, as shown in FIG. 4, to a position to the right wherein the dog 82 will engage a hole 90, it will be apparent that a driving connection between the collar and the sprocket will be produced.

A chain sprocket 96 is also affixed to the reel shaft 28 and a chain 98 drivingly interconnects the sprockets 84 and 96 whereby a driving connection between the reel 24 and the power take-off pulley 16 may be provided.

To insure the proper relationship between the cutting bar 30 and the grass being cut to provide optimum cutting characteristics, a rigid link 100 is interposed between the tractor and the mower structure. The link 100 is attached, at one end, to a sleeve 102 rotatably supported upon the central portion of the ground roller shaft 34, FIGS. 2 and 6. At the other end, the link 100 is pivotally connected to the tractor mounted bracket 104 by the pivot pin 106. As will be apparent from FIG. 6, the ground rollers 38 will be engaging the ground during cutting.

As the arms 42 and the link 100 are rigid, and as one end of the arms and link are pivotally connected to the mower structure, and the other ends of the arms and link are pivotally connected to the tractor structure, the arms 42, link 100, mower structure and tractor structure define a four-bar linkage which prevents angular variation of the mower structure relative to the terrain engaged by the ground rollers. As the ground rollers 38 are located close to the cutter bar 30, it will be appreciated that the proper angular relationship between the cutting bar and the grass being cut will be maintained regardless of the longitudinal inclination of the tractor relative to the mower attachment. The link 100 will not interfere with the raising of the mower structure to the inoperative or transporting position, due to the pivotal connection to the ground roller shaft and the tractor structure. Preferably, the relationships of the pivot pins 54, 56, 60, 106 and roller shaft 34 would be such that the four-bar linkage formed by the arms 42, link 100, mower structure and tractor constituted a parallelogram. Thus, the same angular relationship of the cutter bar to the terrain could be maintained as the mower structure rises or falls with respect to the tractor. However, in the illustrated embodiment clearance problems prevent a true parallelogram linkage from being formed but such is approximated.

It will be noted that the above four-bar linkage mounting of the roller attachment removes any necessity for the end plates 18 to skid, or otherwise engages the terrain and, thus, the need for terrain contact adjacent the mower structure is eliminated, other than that produced by the ground rollers.

As it is desired that the cutting width or swath of the mower attachment be equal to the width of the tractor or other supporting and motive means, a relatively long cutting bar 30 is required. As the relationship between the cutting bar and the reel blades 26 is critical to provide a proper cutting action, deflection of the central portion of the cutting bar away from the reel blades would prevent proper cutting at the center of the swath. To prevent such deflection of the cutting bar at its central portion and insure a linear cutting edge throughout the length of the cutting bar, truss type reinforcing means are affixed to the underside of the cutting bar, see FIGS. 2, 7 and 8. The reinforcing means are in the form of an elongated strip 108 of steel of a length slightly less than the length of the cutting bar. The strip 108 is attached at its end portions to the cutting bar 30 by bolts or rivets 110. The central portion of the strip 108 is provided with a steel pad 112 welded thereto and a compression element in the form of a threaded bolt 114 is threadedly received within a threaded hole 116 defined in the strip 108 and pad 112. A lock nut 118 is associated with the bolt 114 to maintain the desired adjustment and the hexagonally shaped bolt head permits the bolt to be rotated whereby the end of the bolt bears on the cutting bar and the spacing between the central portion of the truss strip and the central portion of the cutting bar may be adjusted. Rotation of the bolt 114 to vary the spacing between the truss strip and the cutting bar varies the compressive forces within the bolt and, thus, permits the proper compression to be produced which maintains the cutting bar edge in a linear form.

To reduce the weight of the mower attachment carried by the roller 38, a tension spring 120 is attached at one end to link 100, FIG. 6, by inserting the lower formed end of the spring through link hole 122. The upper end 124 of the spring 120 is attached to the front of tractor 10. Thus, spring 120 transfers a portion of the mower attachment weight to the tractor front wheels, minimizes the compression of the grass by roller 38, and facilitates lifting of the mower attachment to the inoperative or transport position.

From the above description, it will be apparent that the reel lawn mower attachment proposed fulfills the objects of the invention, and it is appreciated that various modifications to the disclosed embodiment may be apparent to those skilled in the art without departing from the spirit and scope thereof, and it is intended that the invention be defined only by the following claims.

We claim:

1. A reel lawn mower attachment adapted to be mounted upon supporting and motive means comprising, in combination,
   (a) reel lawn mower structure including a pair of spaced end plates interconnected by elongated spacer members,
   (b) an arm pivotally connected to each of said end plates, each of said arms including first and second L-shaped portions each having an end portion transversely disposed to the length of the associated arm portion forming an abutment surface, said end portions of a common arm being adjacently disposed in opposed relation whereby the abutment surfaces thereof are in opposed relation,
   (c) spacer means adapted to be inserted directly between the abutment surfaces of end portions of the arm portions of a common arm,
   (d) fastener means interposed between the end portions of the arm portions of a common arm maintaining the assembly of the arm portions and associated spacer means,
   (e) horizontally disposed pivot means pivotally attaching each arm to the motive means permitting said reel lawn mower structure to be vertically positioned between cutting and transporting positions,
   (f) a reel rotatably mounted upon and supported between said end plates,
   (g) a chain drive sprocket mounted on said motive means coaxial with said horizontally disposed pivot means,
   (h) a chain sprocket mounted on said reel, and
   (i) a chain interconnecting said sprockets.

2. In a reel lawn mower attachment as in claim 1 wherein:
   (a) a ground roller shaft mounted on said end plates,
   (b) a ground roller rotatably supported on said shaft,
   (c) a first link pivotally connected to said mower structure at a first pivot axis and pivotally connected to said motive means at a second pivot axis parallel to said pivot axis,
   (d) a second link pivotally connected to said mower structure at a third pivot axis and pivotally connected to said motive means at a fourth pivot axis parallel to said third pivot axis, said first and third pivot axes being parallel and spaced with respect to each other, said second and fourth pivot axes being relatively spaced whereby said links, motive means and mower structure constitute a four-bar linkage attaching said mower structure to the motive means, and
   (e) a tension spring attached to said second link and the supporting and motive means substantially perpendicularly disposed to said second link transferring a portion of the weight of the mower attachment to the supporting and motive means.

3. A reel lawn mower attachment adapted to be mounted upon supporting and motive means comprising, in combination,
   (a) reel lawn mower structure including a pair of spaced end plates interconnected by elongated spacer members,
   (b) a reel rotatably mounted upon said end plates and interposed therebetween,
   (c) a ground roller shaft mounted on said end plates,
   (d) a ground roller rotatably supported on said shaft,
   (e) a pair of arms pivotally connected to said mower structure at a first pivot axis coaxial with said reel axis of rotation and pivotally connected to said motive means at a second pivot axis parallel to said first pivot axis, said mower structure being located forward of said motive means relative to the normal direction of movement thereof,
   (f) a rigid link directly connected to said ground roller shaft, said shaft constituting a third pivot axis, and pivotally connected to said motive means at a fourth pivot axis parallel to said third pivot axis, said fourth axis being vertically disposed above said third axis, said first and third pivot axes being parallel and spaced with respect to each other, said second and fourth pivot axes being relatively spaced whereby said arms, link, motive means and mower structure substantially constitute a parallelogram linkage attaching said mower structure to the motive means.

4. In a reel lawn mower attachment as in claim 3 wherein:
   (a) an elongated cutting bar having end portions and a central portion, each end portion being affixed to an end plate whereby said cutting bar is disposed parallel to the axis of rotation of said reel and intermediate said end plates,
   (b) an elongated truss member having end portions and a central portion,
   (c) a threaded opening defined in said truss member central portion,
   (d) fastening means fastening the end portions of said truss member directly to said end portions of said cutting bar whereby said truss member is disposed upon and substantially parallel to said cutting bar, and
   (e) a threaded bolt threaded into said opening bearing on said central portion of said cutting bar whereby said truss member resists deflection of said cutting bar transverse to the longitudinal length of said cutting bar.

References Cited by the Examiner

UNITED STATES PATENTS

| | | | |
|---|---|---|---|
| 890,998 | 6/1908 | McGuire | 56—294 X |
| 2,013,597 | 9/1935 | Blydenburgh | 56—26 |
| 2,335,054 | 11/1943 | Godwin | 56—26 |
| 2,505,879 | 5/1950 | Blydenburgh | 56—25 |
| 2,972,218 | 2/1961 | Benson | 56—26 |
| 2,991,612 | 7/1961 | Holmes | 56—25.4 |
| 3,096,606 | 7/1963 | Weir | 56—26 |

ANTONIO F. GUIDA, *Acting Primary Examiner.*

RUSSELL R. KINSEY, *Examiner.*

J. O. BOLT, *Assistant Examiner.*